2 Sheets—Sheet 1.

J. HEFNER.
BEE-HIVES.

No. 193,869. Patented Aug. 7, 1877.

WITNESSES

INVENTOR

2 Sheets—Sheet 2.

J. HEFNER.
BEE-HIVES.

No. 193,869. Patented Aug. 7, 1877.

WITNESSES

INVENTOR.

UNITED STATES PATENT OFFICE.

JOHN HEFNER, OF JAMESTOWN, MICHIGAN.

IMPROVEMENT IN BEE-HIVES.

Specification forming part of Letters Patent No. 193,869, dated August 7, 1877; application filed May 21, 1877.

*To all whom it may concern:*

Be it known that I, JOHN HEFNER, of Jamestown, in the county of Ottawa and State of Michigan, have invented certain new and useful Improvements in Bee-Hives; and I do hereby declare the following to be a full, clear, and exact description of the invention, such as will enable others skilled in the art to which it pertains to make and use it, reference being had to the accompanying drawings, which form part of this specification.

My invention relates to an improvement in bee-hives; and it consists in the arrangement and combination of parts that will be more fully described hereinafter, whereby the hive is more easily managed, and the bees protected from the extreme heat of summer, and from freezing in the winter.

Figure 1:
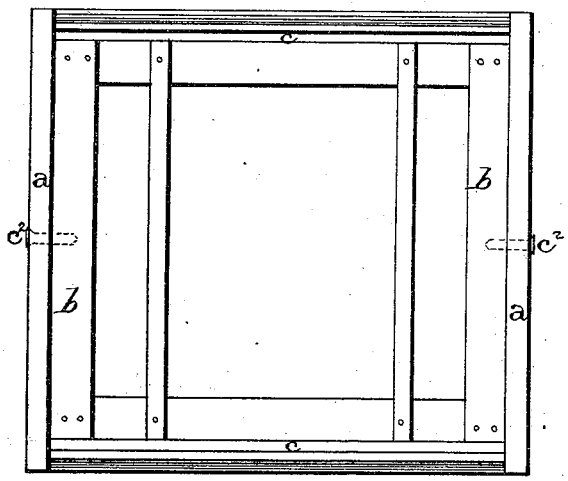
Figure 2:
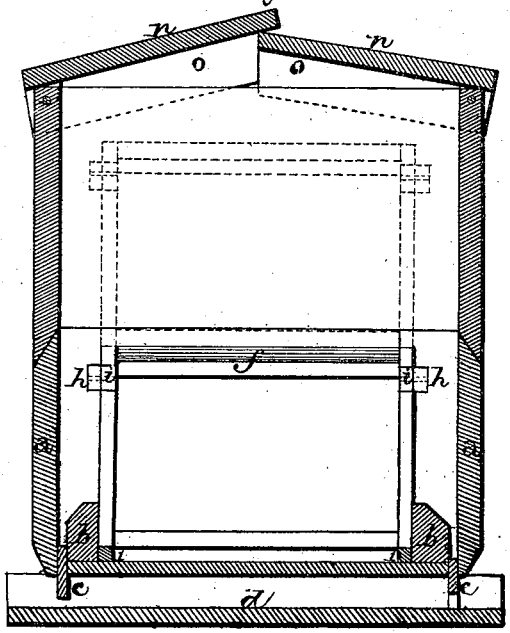
Figure 3:
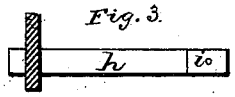
Figure 4:
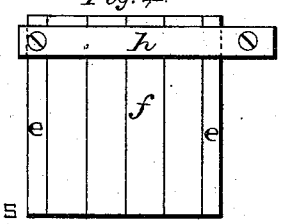
Figure 8:
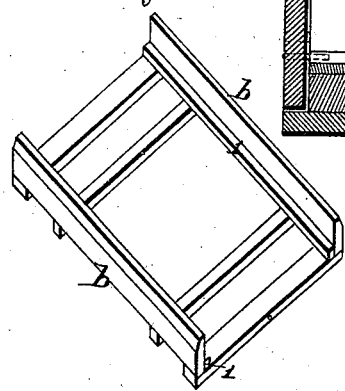
Figure 7:
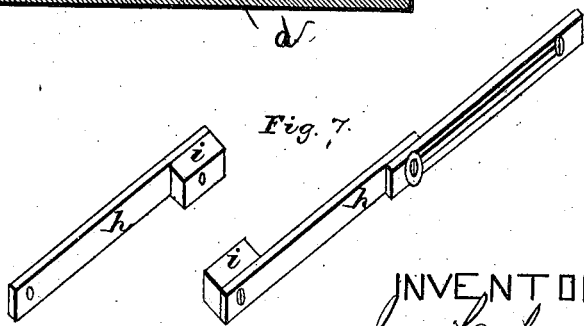
Figure 9:
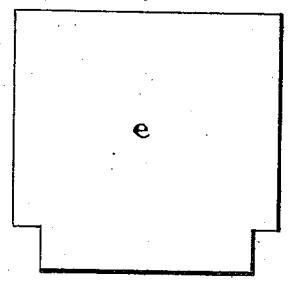

Figure 1 is a plan view of the frame alone, the top and the honey-frames being removed. Figs. 2 and 6 are vertical sections of the hive, taken upon lines at right angles to each other. Figs. 3, 4, 5, and 7 are detail views, showing the levers for binding the honey-frames together. Fig. 8 is a perspective of the hoop, and Fig. 9 is a side elevation of one of the slats.

$a$ represents the lower section of the hive, which is of the usual form and construction, and which has the hoop $b$ pivoted inside of its lower edge. This hoop is preferably constructed as shown in Fig. 8, but is made somewhat narrower than the inside of the hive, so as to leave sufficient space for free ventilation. This hoop has the shoulders 1 formed upon its inside, and serves as a support for the honey-frames $f$, which rest upon its top. This hoop is held in the lower edge of the section $a$ by means of two screws, $c^2$, so that the section may be raised upward, carrying the honey-frames with them, for the purpose of examining the condition of the bees without disturbing them; or, by removing the screws, the section may be raised without in any manner disturbing the honey-frames. The hoop also serves as a means of inserting and holding the ventilating-strips $c$ in position. Passed down into the space left on each side of this hoop is a thin strip, $c$, which can be depressed so as to rest upon the base $d$, or can be raised upward high enough to allow free ventilation to the hive.

Figure 5:
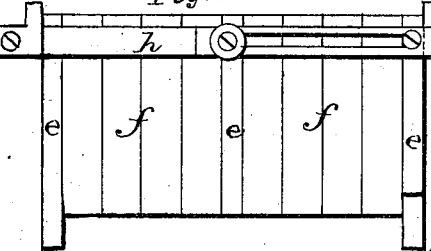
Figure 6:
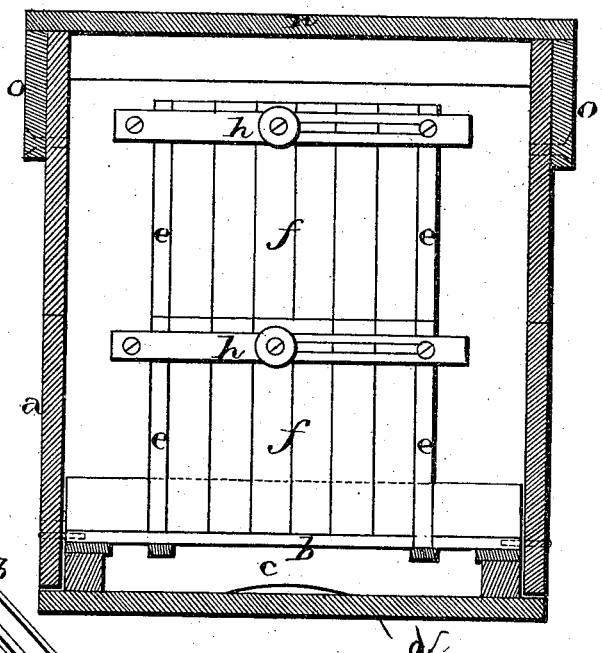

In order to close the ends of the honey-frames $f$, or to divide the frames into two groups, as shown in Fig. 5, the boards $e$ are used. Pivoted to these boards are the levers $h$, which levers are used in pairs, and are provided with the small clamping-blocks $i$ on the insides of their free ends. These blocks catch down over the sides of the boards $e$ after they have been applied to the frames, and serve to clamp the frames securely together. Where there are to be but a small number of frames held together, as in my winter arrangement of the frames, these levers need not be made extensible; but when a large number are to be clamped together, the levers are made extensible, as shown in Fig. 5.

Each section of the hive has its top edges so formed that the section that fits down upon it will be held so securely that it cannot be easily blown over by the wind.

The cover $n$ is made in two parts, and each part is provided with cleats $o$, which pass down over the sides of the top section, as shown in Figs. 2 and 6.

During the summer there will be an open space all around the honey-frames, so as to allow free ventilation and the bees ample room to move all about, and a honey-box will be placed upon the top of the honey-frames to receive the surplus honey; but when winter comes, the honey-frames are divided into two separate groups, and one placed on top of the other, as shown in Fig. 2. The whole interior of the hive around the honey-frames is then filled with bran, or some non-conducting material, and as the frames are in a very compact condition, the warmth of the bodies of the bees will keep the hive so warm that the hives may be left out all winter without any further protection, and without the trouble of even housing them over.

Having thus described my invention, I claim—

1. The pivoted hoop $b$, secured to the inside of the lower section as a support for the honey-frames, substantially as shown.

2. The combination of the hoop $b$, section $a$, and honey-frames *f*, the frames being placed inside of and resting on the hoop, whereby a space is left all around the frames to be packed with bran, substantially as set forth.

3. The combination of the hoop *b* and the strips *c*, the strips being made adjustable up and down between the hoop and the section, so as to afford ventilation for the hive, substantially as specified.

In testimony that I claim the foregoing I have hereunto set my hand this 9th day of May, 1877.

JOHN HEFNER.

Witnesses:
 ORIN DEWEY,
 ARVILLA DEWEY.